E. S. COBB.
FROST PREVENTER FOR ORCHARDS, &c.
APPLICATION FILED FEB. 18, 1919.
1,317,959.
Patented Oct. 7, 1919.
2 SHEETS—SHEET 1.
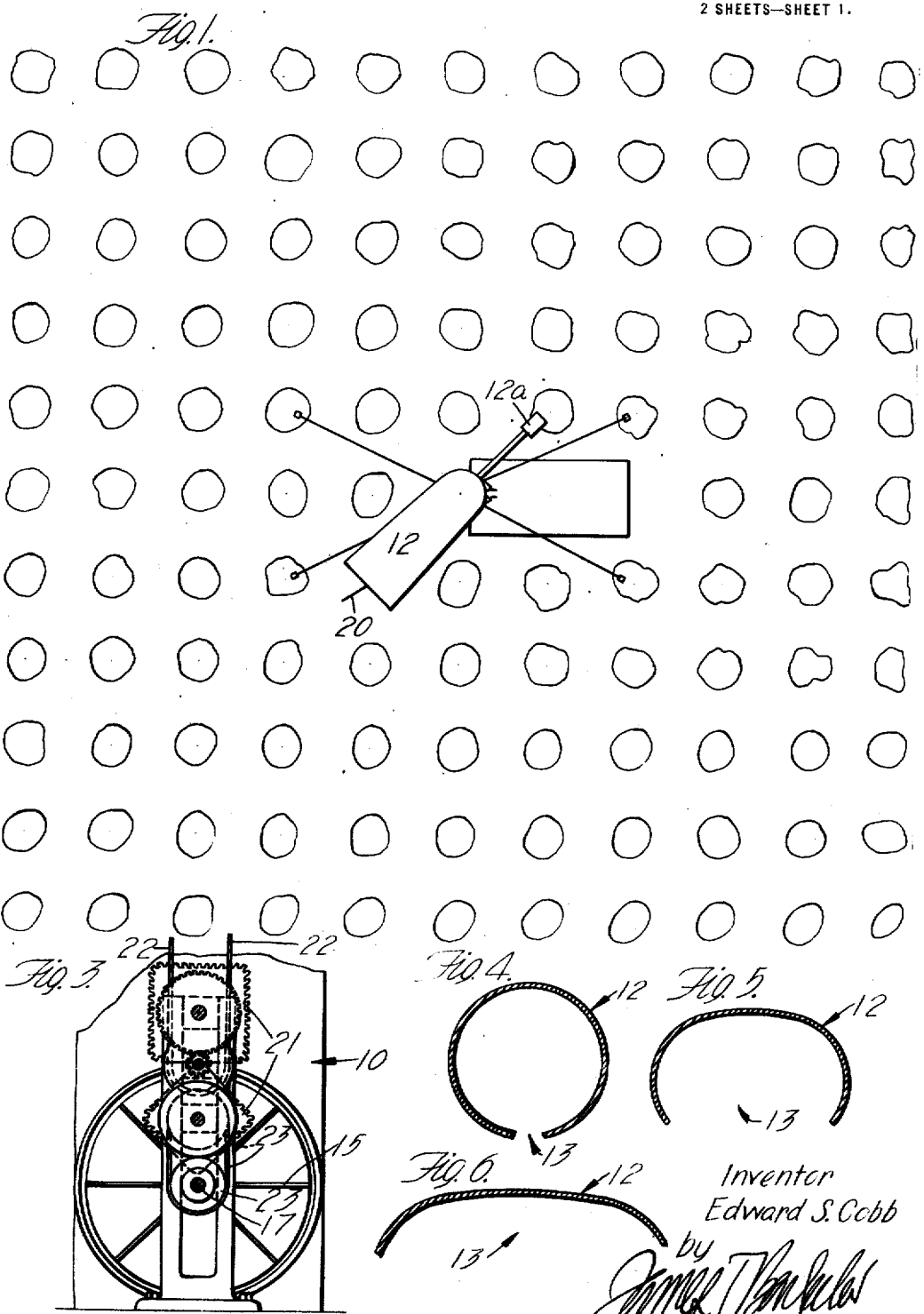
Inventor
Edward S. Cobb
by
his Attorney.

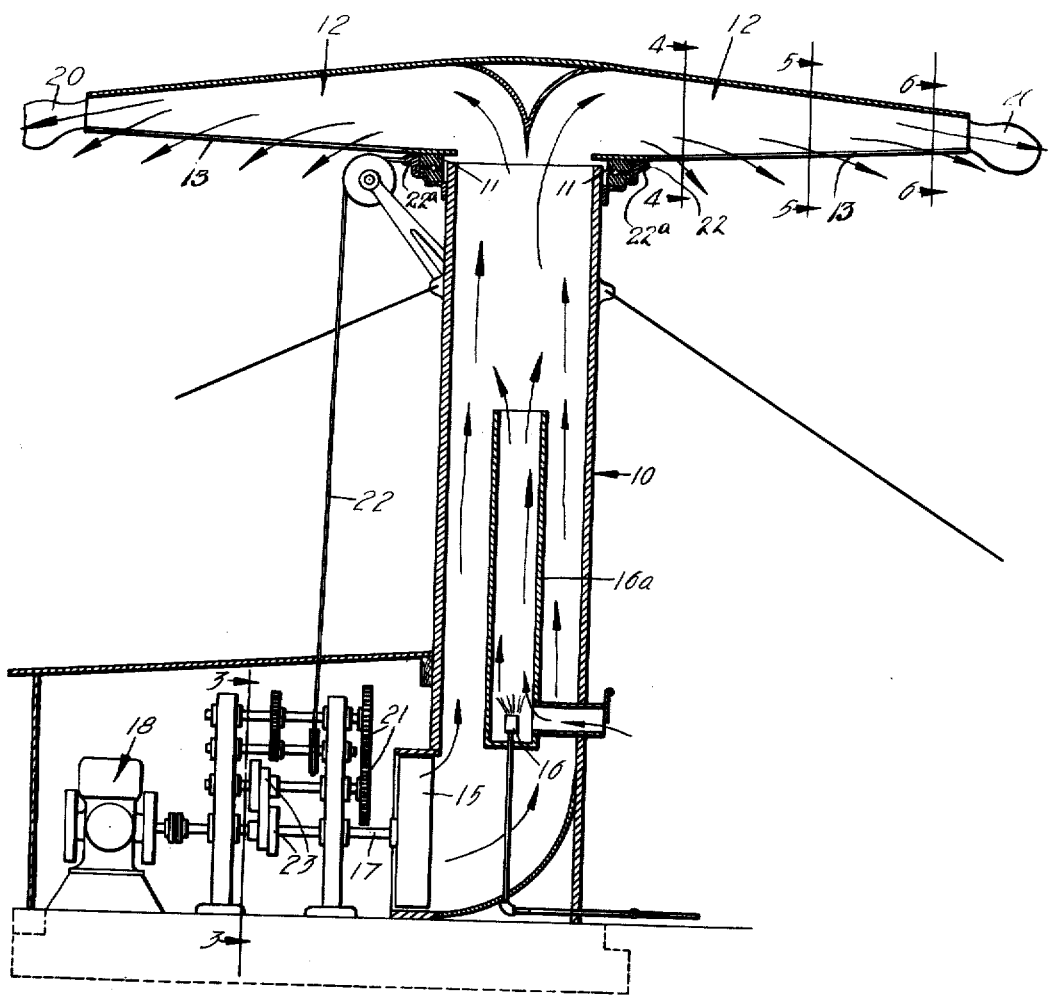

UNITED STATES PATENT OFFICE.

EDWARD S. COBB, OF WHITTIER, CALIFORNIA.

FROST-PREVENTER FOR ORCHARDS, &c.

1,317,959.  Specification of Letters Patent.  Patented Oct. 7, 1919.

Application filed February 18, 1919. Serial No. 277,899.

*To all whom it may concern:*

Be it known that I, EDWARD S. COBB, a citizen of the United States, residing at Whittier, in the county of Los Angeles, State of California, have invented new and useful Improvements in Frost-Preventers for Orchards, &c., of which the following is a specification.

This invention relates to frost preventing means for orchards and the like; and relates more particularly for means for preventing injury to trees and other vegetation by means of keeping up a circulation of air. It is well known that when the air in an orchard is circulating, frost injury to the trees and fruit is thereby prevented unless the temperature goes so low that not even the artificial addition of heat by means of smudge pots and the like, can prevent injury.

The object of my invention is to provide an economical and effective means of causing circulation of air throughout an orchard or the like. I do this by placing in an orchard, or in a subdivision thereof, a device for forcing out a current of air over the different parts of the orchard; and preferably my device takes the form of means for continuously forcing out a current of air and means for directing that current of air in rotative progression over all parts of the orchard. For instance, I employ a stack or hollow column of suitable height, say about 50 feet, and on the upper end of that column I employ a rotating current director or deflector, which may be either single or double; and this rotating current director or deflector will direct a current of air progressively over all parts of the orchard as it is revolved. A device of the size herein indicated is of sufficient power to effectively move the air in all parts of an orchard of about ten acres extent. The intermittent movement of the air gives very good results, because it causes the air to take irregular movement, causing eddy currents, rather than to move in regular and well defined streams at all times in any particular part of the orchard.

I have illustrated a preferred form of my device in the accompanying drawings in which—

Figure 1 is a plan showing my device (a single deflector) in place in an orchard plot;

Fig. 2 is an enlarged vertical section showing my device itself with a double deflector;

Fig. 3 is an enlarged detail section taken as indicated by line 3—3 on Fig. 2; and Figs. 4, 5 and 6 are enlarged detailed sections taken as indicated by lines 4—4, 5—5, and 6—6, respectively, on Fig. 2.

In the drawings I show a vertical hollow column or stack 10 set upon any suitable foundation and which I set preferably centrally in the orchard. From the upper end of this stack, upon suitable bearings, as indicated at 11, I mount, either in a single or in a multiple form, a rotatable air current directing member 12. The single form may be counterbalanced as shown at 12ª in Fig. 1. The multiple form is balanced in itself. Such a member may very well be made of sheet metal bent to the configuration illustrated, and having on its under side a slot-like opening 13 which increases in width toward the ends of member 12. In fact, the member 12 flares out into a more or less fan-like shape; and the current of air which emerges from the slot is sent outwardly and downwardly so as to be distributed to every tree in the orchard, both far and near. By the gradually expanding slot on the lower side and the fan-shape of the distributer, these results are attained; in being directed more sharply downwardly at the inner part of the deflector, in comparatively less volume, and more nearly horizontally (but still downwardly) at the outer end of the deflector, but in comparatively larger volume. As the director 12 rotates, this current of air is directed to all the different parts of the orchard, and, passing through the trees, disturbs all of the air in the trees and thus causes a complete change of air in the trees once or more times for every revolution of the director.

I may utilize a power driven fan, as shown at 15, for the purpose of forcing air up through stack 10, and if I find it necessary I may utilize a burner 16, such as an oil burner, to heat the air in stack 10, the heated air and the heated products of combustion being thrown out of the stack together by the operation of fan 15. This burner will seldom be needed only in case of extreme cold; but if it is used it may be inclosed in a metal tube 16ª to protect the stack (which may be of wood) and to deliver all the heat of fuel combustion to the current. The fan is a large powerful one, being say of about 12 feet in diameter, the stack 10 being also of about the same diameter. Fan 15 may be driven directly by shaft 17 from a motor or engine 18.

The air director 12 may be either driven mechanically from the engine 18 or it may be caused to rotate by the use of a vane or vanes 20 set on the end or ends of the director and in a position diagonal to the current of air; so that by reaction this vane or vanes will cause the director to rotate at a suitable speed of rotation. However, it may be preferred to rotate the director positively by mechanical means, and in such case it is practicable to make the director move more slowly, as it is passing the diagonal of a square or rectangular field, (or, generally speaking, when it is passing a more distant point), and more fast as it moves between diagonals; so that when the director is pointed in the direction of the far corners of the field, it moves more slowly so as to give equal air current effect to the far corners as well as to the nearer sides. For this purpose I may utilize a driving mechanism which includes (for the case of a square field) a pair of square gears 21. The ultimate connection to the director may be made by a rope or cable drive as shown at 22, this cable passing around a sheave 22* attached to the member 12; the proportions of the pulleys and of the gears being such that one complete rotation of a gear will always cause one complete rotation of the director, and the parts being set in such relations that the director moves fast and slow as hereinabove stated. Furthermore, the drive for the director may also include a variable speed driving arrangement as shown at 23, so that the director may be rotated at a slower or faster speed of rotation as may be desired to suit different circumstances arising.

It will be seen that in either single or multiple form the director or deflector member is counterbalanced, either by a special weight, or counterbalanced in itself. The construction is also made so that the director will always be balanced as regards wind pressure. The multiple form is so balanced in itself and the single form will have its counterbalance so constructed as to give equal resistance to wind pressure on opposite sides of the center.

The following claims are directed to the apparatus herein described; the method here described is the subject matter of my application S. N. 291,851, filed April 22nd, 1919.

Having described a preferred form of my invention, I claim:

1. Plantation protecting apparatus of the character described, embodying a vertical stack extending to a point above the plantings to be protected, means for forcing air upwardly through the stack, a rotatable director mounted at the top of the stack to direct such current of air outwardly from the stack and downwardly, and means to rotate the director in a substantially horizontal plane.

2. Plantation protecting apparatus of the character described, embodying a vertical stack extending to a point above the plantings to be protected, means for forcing air upwardly through the stack, a rotatable director mounted at the top of the stack to direct such current of air outwardly from the stack and downwardly, such director means including means to regulate the distribution of the air, and means to rotate the director in a substantially horizontal plane.

3. Plantation protecting apparatus of the character described, embodying a vertical stack extending to a point above the plantings to be protected, means for forcing air upwardly through the stack, a rotatable director mounted at the top of the stack to direct such current of air outwardly from the stack and downwardly, and means to rotate said director at a varying speed.

4. Plantation protecting apparatus of the character described, embodying a vertical stack extending to a point above the plantings to be protected, means for forcing air upwardly through the stack, a rotatable director mounted at the top of the stack to direct such current of air outwardly from the stack and downwardly, and means to rotate said director faster in some parts of its revolution than in others.

5. In a device of the character described, a vertical stack, a power-operated fan adapted to drive a current of air upwardly through the vertical stack, a horizontally extending current deflector rotatably mounted on the upper end of the stack, said deflector extending out from the stack in fan-like shape and having a gradually outwardly widening slot on its under side, and means to rotate said deflector.

6. In a device of the character described, a vertical stack, a power-operated fan adapted to drive a current of air upwardly through the vertical stack, a horizontally extending current deflector rotatably mounted on the upper end of the stack, said deflector extending out from the stack in fan-like shape and having a gradually outwardly widening slot on its under side, and means operated in conjunction with the fan to rotate said deflector.

7. In a device of the character described, a vertical stack, a power-operated fan adapted to drive a current of air upwardly through the vertical stack, a horizontally extending current deflector rotatably mounted on the upper end of the stack, said deflector extending out from the stack in fan-like shape and having a gradually outwardly widening slot on its under side, and means to rotate said deflector at a speed faster in some portions of its revolution than in others, 8. Plantation protecting apparatus of the character described, embodying a vertical stack of a height greater than the plantings to be protected, means for mechanically positively forcing air upwardly through the stack, and means at the upper end of the stack to direct such air outwardly above the plantings to be protected.

9. Plantation protecting apparatus of the character described, embodying a vertical stack of a height greater than the plantings to be protected, means for mechanically positively forcing air upwardly through the stack, means to heat the air in the stack, and means at the upper end of the stack to direct such air outwardly and downwardly above and downwardly onto the plantings to be protected.

10. Plantation protecting apparatus of the character described, embodying a horizontally rotatable director, a suitable structure for supporting the director in an elevated position above the plantings to be protected, and means to force air outwardly through the director; said director directing such air outwardly substantially radially to its center of rotation and including means for distributing the air current equably throughout a vertically extending zone which is included within an angle in a vertical plane, the apex of the angle being at the distributer.

In witness that I claim the foregoing I have hereunto subscribed my name this tenth day of February, 1919.

EDWARD S. COBB.

Witness:
V. BERINGER.